(12) United States Patent
Halbheer et al.

(10) Patent No.: US 11,573,163 B2
(45) Date of Patent: Feb. 7, 2023

(54) DENSITY MONITOR WITH INTEGRATED LOW PRESSURE INDICATOR

(71) Applicant: Trafag AG, Bubikon (CH)

(72) Inventors: Remo Halbheer, Hinwil (CH); Achim Pahlke, Schwerzenbach (CH)

(73) Assignee: Trafag AG, Bubikon (CH)

( * ) Notice: Subject to any disclaimer, the term of this patent is extended or adjusted under 35 U.S.C. 154(b) by 57 days.

(21) Appl. No.: 17/045,099

(22) PCT Filed: Mar. 22, 2019

(86) PCT No.: PCT/EP2019/057198
§ 371 (c)(1),
(2) Date: Oct. 2, 2020

(87) PCT Pub. No.: WO2019/192857
PCT Pub. Date: Oct. 10, 2019

(65) Prior Publication Data
US 2021/0148801 A1  May 20, 2021

(30) Foreign Application Priority Data
Apr. 3, 2018 (DE) .......................... 102018107852.8

(51) Int. Cl.
*G01N 9/26* (2006.01)
*G01L 19/08* (2006.01)

(52) U.S. Cl.
CPC ............ *G01N 9/266* (2013.01); *G01L 19/083* (2013.01)

(58) Field of Classification Search
CPC ......... G01N 9/266; G01L 19/083; G01L 7/06; G01L 7/068; G01L 7/024; G01L 7/028
(Continued)

(56) References Cited

U.S. PATENT DOCUMENTS 2,652,859 A * 9/1953 Murphy .................... G01L 7/00
92/13.2

FOREIGN PATENT DOCUMENTS

DE 10 2012 019 617 A1 4/2014
DE 10 2017 104 919 A1 9/2018
(Continued)

OTHER PUBLICATIONS

IFM Electronic GMBH, Schulungsunterlagen Efector 500, 115 pages (2003).
(Continued)

*Primary Examiner* — Robert R Raevis
(74) *Attorney, Agent, or Firm* — United One Law Group LLC; Kongsik Kim; Jhongwoo Peck

(57) ABSTRACT

The invention relates to a density monitor (10) for monitoring a gas density in a gas chamber (20). The density monitor (10) comprises a measuring apparatus (12) having a first measuring device (24) and a second measuring device (28), the two measuring devices (24; 28) being coupled together. The first measuring device (24) is designed to measure a first pressure range (62) in relative terms with respect to an atmosphere, and the second measuring device (28) is configured to measure a second pressure range (64) in absolute terms. The density monitor (10) further comprises an indicator device (50), which is designed to indicate the two pressure ranges (24; 28). The density monitor (10) also comprises a movable drive element (48), which is designed to drive the indicator device (50), wherein at least one of the two measuring devices (24; 28) is designed to move the drive element (48) in order to drive the indicator device (50), wherein the indicator device (50) comprises an indicator element (58) which is designed to indicate the two pressure ranges (62, 64).

11 Claims, 6 Drawing Sheets

(58) Field of Classification Search
USPC .................. 73/30.02, 30.04, 729.1, 700–756
See application file for complete search history.

(56) References Cited

FOREIGN PATENT DOCUMENTS

JP          55078231    *   6/1980
JP        2003270073    *   9/2003

OTHER PUBLICATIONS

Trafag Sensors Controls SF6 Gas Monitoring, High & Medium Voltage, 12 pages (2011).

* cited by examiner

DENSITY MONITOR WITH INTEGRATED LOW PRESSURE INDICATOR

CROSS-REFERENCES TO RELATED APPLICATIONS

This application is a National Stage Entry of International Application PCT/EP2019/057198 filed on Mar. 22, 2019, which claims priority from German Application 102018107852.8 filed on Apr. 3, 2018. The aforementioned patent applications are incorporated herein by reference in their entirety.

The invention relates to a density monitor for monitoring a gas density in a gas chamber.

Such a density monitor is known, for example, from the company brochure "$SF_6$ Gas Monitoring" of Trafag AG with the printing note H7643b of October 2011. Here, a separating element is arranged on a measuring bellows inside of which there is a reference volume. One end of the measuring bellows is fixed; on the other end of the measuring bellows said separating element is arranged. If the pressure in said gas volume increases against the reference volume, this will cause the separating element to move. To the separating element a drive element in the form of a driving tappet is fixed which, as an indicator element of an indicator device, actuates a pointer that moves relative to a scale. The pointer shows the respective gas density.

As known from the aforementioned publication, density monitors are used in particular for monitoring the density of the insulating gas—typically $SF_6$—of gas-insulated switchgears. The main task is the close monitoring and displaying of the temperature-compensated filling pressure of the system. This is implemented by the accurate reference chamber measuring mechanism and the associated high-resolution reference scale. However, this has the disadvantage that the measuring range is limited due to the high resolution.

If it is desired to measure, for example for transports or the like, a lower pressure range than the pressure indicated by the high-resolution main scale within the gas chamber to be monitored, an additional measuring mechanism with a lower resolution must be provided.

The object of the invention is to provide a density monitor, which allows a wider range of applications.

This object is achieved by a density monitor for monitoring a gas density in a gas chamber. Advantageous designs with useful and non-trivial further developments of the invention are stated in the dependent patent claims.

The invention provides a density monitor for monitoring a gas density in a gas chamber. The density monitor comprises a measuring apparatus with a first measuring device and a second measuring device, wherein said first measuring device and said second measuring device are coupled together. The first measuring device is arranged to measure a first pressure range in relative terms with respect to an atmosphere. The term "relative" means in particular that a relative pressure is measured. In the case of a relative pressure, the pressure is measured in relation to the pressure, especially the air pressure, of the atmosphere or environment. The average atmospheric pressure at sea level is 1013.25 mbar. The first pressure range preferably is a low pressure range. For example, the low pressure range includes pressure values between −300 and 620 kPa. The term "measuring the first pressure range" means in particular that the first measuring device is configured to record pressure values or pressures within the first pressure range. The second measuring device is configured to measure a second pressure range that is higher than the first pressure range in absolute terms. The term "measuring the second pressure range" means in particular that the second measuring device is configured to record pressure values or pressures within the second pressure range. Preferably, the second pressure range is an operating pressure range or high-pressure range. For example, the operating pressure range includes pressure values between 620 kPa and higher than 700 kPa. In particular, these two measuring devices—first measuring device and second measuring device—are coupled together or connected to each other in such a way that the first pressure range can be measured or recorded in relative terms with respect to an atmosphere and thereafter the second pressure range can be measured or recorded in absolute terms successively or sequentially. The term "absolute" means that an absolute pressure is measured. The absolute pressure is in particular a pressure that is relative to the pressure (zero pressure) in the empty space. The density monitor further comprises an indicator device, which is configured to indicate the first pressure range and the second pressure range. Further, the density monitor comprises a movable drive element, which is designed to drive or control the indicator device, wherein at least one of the two measuring devices is configured to move the drive element in order to drive the indicator device. Further, the indicator device comprises an indicator element, which is designed to indicate the two pressure ranges. Preferably, the drive element acts on the indicator device in order to move the indicator element. The pointer can be arranged on a display area that includes a scale, which indicates the two pressure ranges. The pointer can move relative to the scale in order to indicate the pressure ranges. For this purpose, the indicator device can include a measuring mechanism. The drive element can act on the measuring mechanism of the indicator device in such a way that the pointer can be moved, especially in dependence of the measured or recorded pressure.

By coupling the first measuring device and the second measuring device together, it is possible to indicate or show the two pressure ranges—first pressure range and second pressure range—on the same indicator device. Accordingly, no additional indicator device is required. Further, by coupling the two measuring devices—first measuring device and second measuring device—together, it is possible to record two pressure ranges that are different from each other and to indicate them with a single indicator device. Thus the density monitor has a particularly high resolution and a particularly broad measuring range, which enables a particularly wide range of application of the density monitor.

One advantageous embodiment provides that the second measuring device is designed to measure the second pressure range in a temperature-compensated manner. The term "measuring" means in particular to determine or detect or to record. The term "temperature compensation" is understood in particular to be a measure that counteracts an undesired influence of temperature, especially with the aim that a change of temperature does not lead to a change in the behavior of the density monitor or to a damage of the density monitor. The term "temperature-compensated" means in particular the temperature-compensated zone. The temperature-compensated zone especially is the temperature zone in which the temperature error or the temperature coefficients apply. The temperature compensation allows the density monitor to operate particularly accurately and reliably.

One preferred design of the density monitor includes an indicator device that can be driven by the drive element and that includes the indicator element, which moves relative to a display area of the indicator device. The scale preferably shows the first pressure range and the second pressure range that is adjacent in particular to the first pressure range. The drive element and the indicator element are arranged and/or designed in such a way that the indicator element is located between the low pressure zone and the high-pressure zone when the stop is grasped and released.

Another advantageous embodiment provides that the indicator device further includes a display area provided with characters and/or a scale, the indicator element and/or the characters and/or the scale comprising a phosphorescent or fluorescent material. In other words, the indicator element and/or the characters and/or the scale can be formed from a phosphorescent or fluorescent material. The term "phosphorescence" particularly is the afterglow property of a substance in the dark after illumination with visible UV light. Phosphorescent materials can usually be crystals with a small admixture of a foreign substance that disturbs the lattice structure of the crystal. Usually sulphides of metals of the second group as well as zinc are used and small amounts of heavy metal salts are added, for example zinc sulphide with traces of heavy metal salts. The term "fluorescence" particularly means the spontaneous emission of light shortly after the excitation of a substance by electronic transitions. Both fluorescence and phosphorescence are forms of luminescence, which can also be referred to as cold glow, and are photophysical processes. Fluorescence is particularly characterized in that it rapidly ceases after the end of irradiation, mostly within one millionth of a second. On the other hand, in the case of phosphorescence, there is an afterglow that may last from fractions of a second up to hours. The phosphorescent or fluorescent material especially increases the readability of the indicator device, whereby the reliability of the density monitor is improved.

Advantageously, the second measuring device has a second movable separating element, which is designed to separate a closed reference volume that is to be filled with a reference pressure from the gas chamber, said second separating element being arranged on a second measuring bellows that separates the reference volume from the gas chamber. In a corresponding manner, the second measuring device can also be referred to as a reference chamber measuring mechanism. For example, the second separating element can be designed as a separating wall, especially as a movable separating wall. The term "bellows" means in particular a tube from a predetermined material which is contractible or foldable in the manner of an accordion. The term "movable" means in particular that the second separating element is held or supported in a slidable or displaceable manner.

An advantageous further development provides that the first measuring device comprises a first movable separating element, which is configured to separate the gas chamber from a further space, the first movable separating element being disposed on the first measuring bellows that separates the gas chamber from said further space, and the first separating element and the second separating element being movable relative to each other limited by a stop so that one separating element it is movable relative to the other separating element to an extent limited by the stop. For example, the first separating element and also the second separating element can be designed as a separating wall, in particular as a movable separating wall. The term "bellows" means in particular a tube from a predetermined material which is contractible or foldable in the manner of an accordion. The term "movable" means in particular that the second separating element is held or supported in a slidable or displaceable manner. The term "space" means in particular a predetermined or delimited area or a volume with a delimited or predetermined expansion. The term "stop" means in particular a position up to which something can be moved or displaced. The stop has the advantage that the first measuring device and the second measuring device can be coupled together particularly easily and reliably, especially mechanically.

It is preferred that the drive element is coupled to the first movable separating element or to the second movable separating element for co-movement. Particularly preferably, the stop limits the movement of the first movable separating element and of the coupled second drive element relative to the second movable separating element. By arranging the drive element on or coupling the drive element to one of the two separating elements, the drive element can be moved particularly easily and reliably.

Advantageously, the second movable separating element is arranged on the second measuring bellows that separates the reference volume from the gas chamber, and/or the first movable separating element is arranged on a first measuring bellows that separates the gas chamber from the further space or further chamber. Particularly preferably, the first measuring bellows and the second measuring bellows are arranged concentrically to each other. It is preferred that the reference pressure in the reference volume is higher than the pressure in the further space and/or that the further space has ambient pressure.

It is preferred that the second measuring bellows comprises an outer bellows and an inner bellows which define the reference volume between them. In other words, the second measuring bellows can enclose the reference volume. Preferably, the first measuring bellows is arranged within the inner bellows of the second measuring bellows. In other words, the first measuring bellows can preferably be surrounded by the second measuring bellows, in particular by the inner bellows of the second measuring bellows. This arrangement has the advantage that the coupling of the first measuring device and the second measuring device is particularly simplified on the one hand and that the size or dimensions of the measuring apparatus can be reduced on the other hand.

It is preferred that the drive element includes a driving tappet which drives or moves the indicator element of the indicator device, in particular the pointer. In other words, the drive element can act on the pointer in such a way that a rotation of the pointer can be realized or implemented as a result. Further, the driving tappet or the drive element can be disposed inside the first measuring bellows and/or inside the second measuring bellows. In other words, the driving tappet or the drive element can be accommodated in the first measuring bellows and/or in the second measuring bellows.

An advantageous and especially an alternative embodiment provides that the first measuring device has a pressure membrane for measuring the first pressure range. Preferably, the pressure membrane is designed to drive the indicator device, in particular through a stroke of the pressure membrane. In other words, the stroke of the pressure membrane can be used for driving the indicator device. In particular, the pressure membrane acts on the movable drive element in order to drive the indicator device. Said "pressure membrane" is understood to be in particular a flexible or elastic membrane. The "membrane" is preferably a two-dimensional or thin-layer material that is subject to pull or pressure. The pressure membrane allows to record the first pressure range particularly easily and reliably. The pressure membrane is preferably coupled to or disposed on the second separating element that can also be referred to as a reference chamber bottom. Additionally or alternatively, the pressure membrane can be disposed on the first separating element that can also be referred to as a low pressure bottom.

Advantageously and particularly in an alternative embodiment, the first measuring device comprises a tubular spring for measuring the first pressure range. In the other words, the first measuring device can also be referred to as a tubular spring measuring mechanism. The term "tubular spring" means in particular a measuring element for measuring pressure differences. The tubular spring is in particular a flattened metal tube that is coiled in a circular, spiral or helical manner. When pressure is applied to the spring, the spring tends to bend open. For example, a change of travel of the spring end of the tubular spring can be transmitted to the measuring mechanism via a pull rod and can be translated into a rotation of the pointer axis. Preferably, a pinion of the indicator device is coupled to the tubular spring in such a way that when the first pressure range is measured, a radial movement is transmitted to the indicator device, and this radial movement is converted into a rotational movement of the pointer in order to indicate the first pressure range. Preferably, the pinion of the measuring mechanism is connected to the tubular spring. This allows a radial movement to be transmitted to the measuring mechanism in low pressure ranges, especially the first pressure range, which radial movement is then converted into a rotational movement of the pointer. The "pinion" is understood to be a gear that drives another gear, which is especially larger than the pinion.

Preferably, the tubular spring is coupled to the gas chamber, especially fluidically. The tubular spring can, for example, be coupled or linked or connected to the gas chamber via a passage. In particular, the tubular spring or the passage is partially arranged inside the gas chamber. By being at least partially arranged inside the gas chamber, the tubular spring is adapted to record a pressure or pressures or pressure changes of the first pressure range.

An advantageous and especially an alternative embodiment provides that the first measuring device comprises a pressure cell for measuring the first pressure range. A pressure cell or pressure membrane can also be referred to as an aneroid barometer. In an aneroid barometer, a can-like hollow body from sheet metal, especially thin sheet metal, can be deformed by the pressure. There is a predetermined pressure in the can which compensates the change in the elastic modulus of the sheet metal by the temperature. This deformation, which is a compression when the pressure increases and an expansion when the pressure decreases, is transmitted to the drive element via a mechanism. The indicator device preferably comprises a transmission element configured to receive a vertical movement of the aneroid barometer and to translate this vertical movement into a rotational movement of the indicator element for indicating the first pressure range. The transmission element is designed for example as a pin. In an advantageous manner, the measuring mechanism can receive vertical movements via two pins and can translate these vertical movements into a rotational movement of the pointer. In this case, one pin can be assigned to the aneroid barometer and the additional pin to the drive element. Preferably, the aneroid barometer is coupled to the gas chamber, especially fluidically. For example, the aneroid barometer can be coupled or linked to the gas chamber via a passage. In particular, the aneroid barometer or the passage is partially arranged inside the gas chamber. By this partial arrangement of the aneroid barometer inside the gas chamber, the aneroid barometer is adapted to record a pressure or pressures or changes in pressure of the first pressure range.

Preferred designs of the density monitor create a measuring apparatus with which, on the one hand, the density of a gas within the gas chamber can be monitored with high resolution and accuracy during the operation of a switchgear and, on the other hand, an additional pressure range, especially a low pressure range, can be monitored—for example during transport or filling of the switchgear.

This is preferably done with reliable mechanical means with simple construction. In particular, both a low pressure range and a higher pressure range can be indicated by means of a common indicator element.

The invention also includes a measuring apparatus, which measuring apparatus comprises a first measuring device and a second measuring device, wherein said first measuring device and said second measuring device are coupled together, especially mechanically. The first measuring device is designed to measure a first pressure range in relative terms with respect to an atmosphere. The second measuring device is designed to measure a second pressure range, which is higher than the first pressure range, in absolute terms.

The invention also includes further developments of the measuring apparatus according to the invention. These further developments include features that have already been described in context with the further developments of the density monitor according to the invention so that the description thereof will not be repeated.

One exemplary embodiment of the invention will be described in the following with reference to the attached drawings wherein it is shown by:

The design examples described in the following represent preferred embodiments of the present invention. In these design examples, the described components of the embodiments each show individual features of the invention which are to be considered independently of each other and which constitute further developments of the invention that are also independent from each other and are thus part of the invention either separately or in a combination other than the one which is shown. Furthermore, the described embodiments can also be supplemented by further features of the invention already described above.

Elements in the figures which are similar or have a similar function are identified by the same reference signs.

Figure 1:
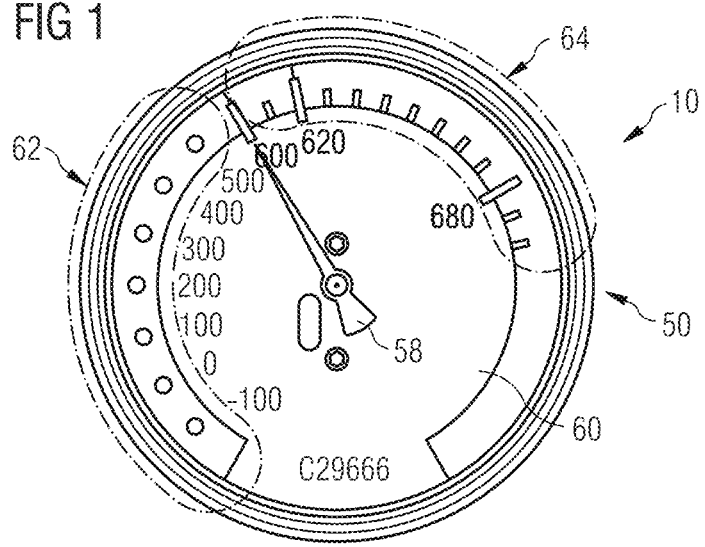
FIG. 1 is a schematic representation of a preferred design of a density monitor.
Figure 1:
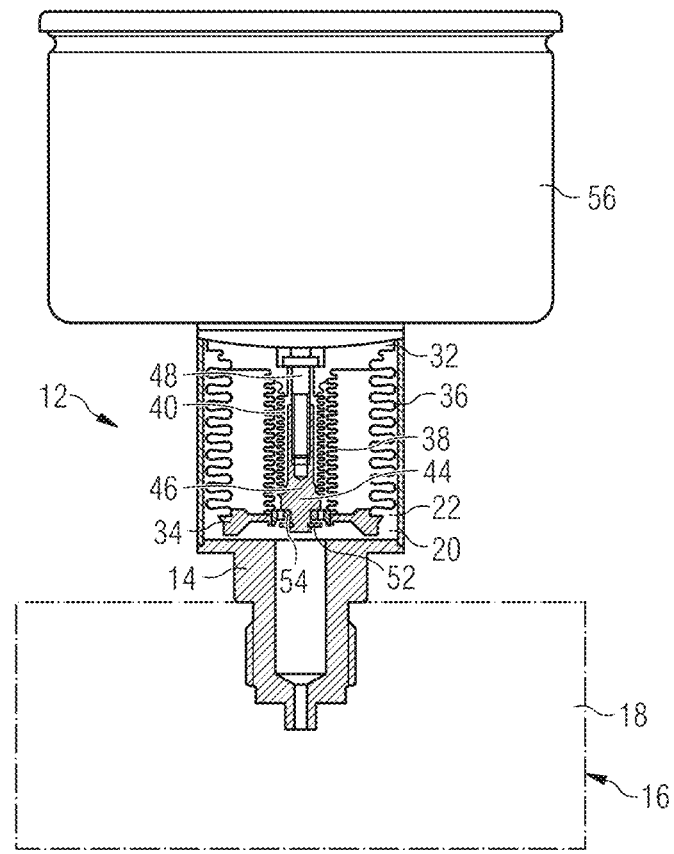

FIG. 1 shows one embodiment of a density monitor 10, which comprises a measuring apparatus 12. The measuring apparatus 12 is shown one more time at an enlarged scale in FIG. 2.

The density monitor 10 has a system-side pressure connection 14 for connection to a system 16. The system 16 is to be filled with gas and must be monitored for its gas density. The system 16 is, for example, a high voltage switching system, a high voltage converter, a high voltage pipeline, a switching device and/or a transformer. In the system 16, a system gas 18 is present, which is in fluid communication with a system gas chamber or gas chamber 20 in a housing of the density monitor 10, which can also be referred to as a sensor housing 22, via said pressure connection 14. In other words, the system 16 and the gas chamber 20 are fluidically coupled to each other via said pressure connection 14.

Figure 4:
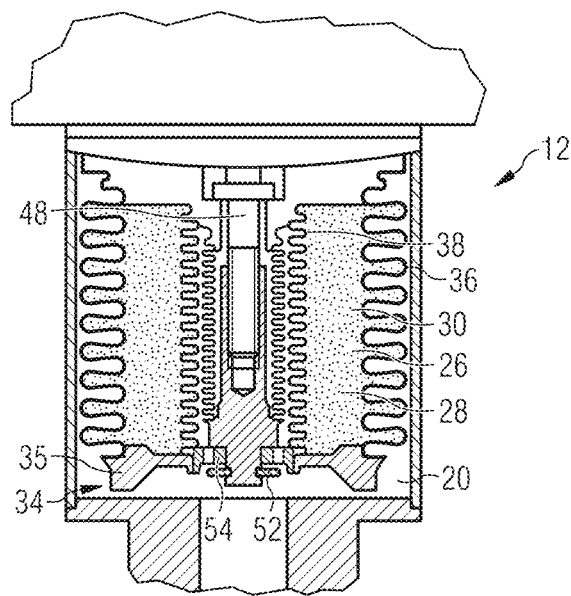
FIG. 4 is the measuring apparatus of FIG. 2, highlighting a reference volume.
Figure 5:
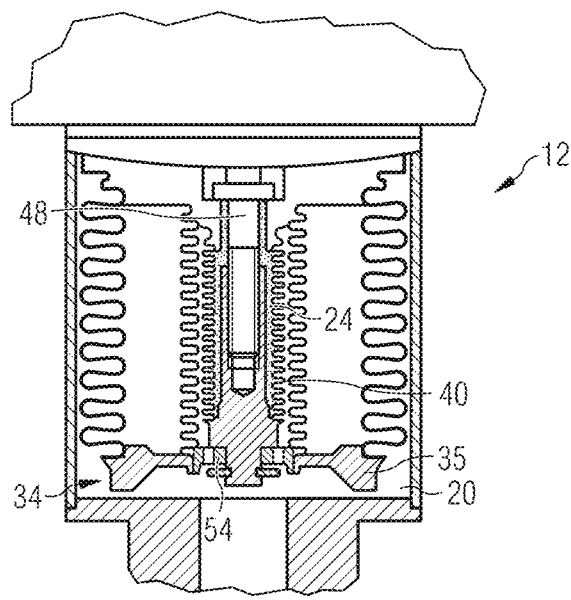
FIG. 5 is the measuring apparatus of FIG. 2, highlighting the first measuring device for a low pressure measurement.

The measuring apparatus 12 is accommodated or received in the sensor housing 22 at least partially, which means completely or partially. The measuring apparatus 12 comprises a first measuring device 24, highlighted in FIG. 5, and a second measuring device 28, highlighted in FIG. 4. The second measuring device 28 is filled with a reference gas 26. The first measuring device 24 is designed to measure a first pressure range, especially in relative terms. The second measuring device 28 is configured to measure a second pressure range, especially in absolute terms and/or in temperature-compensated manner.

The second measuring device 28 comprises a second measuring bellows 30. The second measuring bellows 30 is stationary on one end, here on a reference chamber lid 32. On its other end, the second measuring bellows 30 has a reference chamber bottom 34. The reference chamber bottom 34 can be formed as a second separating element 35, in particular as a second separating wall.

The second measuring bellows 30 has an outer bellows 36 and an inner bellows 38. The outer bellows 36, the inner bellows 38, the reference chamber bottom 34 acting as a second separating element 35, and the reference chamber lid 32 enclose a reference chamber or a reference space which, as a reference volume, is to be filled with a predetermined reference pressure of the reference gas 26.

In a corresponding manner, the second measuring device 28 can also be referred to as a reference chamber measuring mechanism.

The first measuring device 24 has a first measuring bellows 40. This first measuring bellows 40 is especially designed as a low pressure bellows 42.

The first measuring bellows 40 is arranged concentrically with the second measuring bellows 30. In other words, the second measuring bellows 30 can surround the first measuring bellows 40. In particular, the low pressure bellows 42 is arranged inside the inner bellows 38. At one end, the first measuring bellows 40 is also stationary, for example in the area of the reference chamber lid 32.

At the other end, the first measuring bellows 40 comprises a low pressure bottom 46 designed as a first separating element 44, which is especially movable. The first separating element 44 is coupled to a drive element 48 the movement of which is transmitted to an indicator device 50 via a transmission.

In the illustrated exemplary embodiment, the drive element 48 comprises a driving tappet, for example in the form of a switch rod. In this manner, the drive element 48 is coupled to the first movable separating element 44 for a joint movement.

The second separating element 35 formed by the reference chamber bottom 34 and the first separating element 44 formed by the low pressure bottom 46 can move relative to each other to a limited extent. The movement is limited by an upper stop 52 in one direction and by an additional stop, e.g. in the form of a driver 54, in the other direction. Via the driver 54, the first movable separating element 44 can take along the drive element 48—e.g. the switch rod—when moving upwards in FIG. 2.

The switch rod can be designed in a manner such as disclosed in the company brochure "SF6 Gas Monitoring" of Trafag AG mentioned at the beginning. According to this, the switch rod in a density monitor housing 56 (manometer housing) can actuate a switch (not shown) when it moves. In addition, the switch rod can actuate the indicator device 50 by moving a pointer 58 of the indicator device 50 on a display area provided with a scale 60.

The scale 60 presents a first pressure range 62, which can be designed as a low pressure indicator, and a second pressure range 64, which can be designed as a high-resolution main scale or a high-pressure indicator. The first pressure range 62 and the second pressure range 64 are arranged side by side, especially adjacent to one another.

The indicator element 58, i.e. the pointer, and/or the characters on the display area and/or the scale 60 comprise a phosphorescent or fluorescent material. In other words, the indicator element 58, i.e. the pointer, and/or the characters on the display area and/or the scale can be created from a phosphorescent or fluorescent material.

Figure 3:
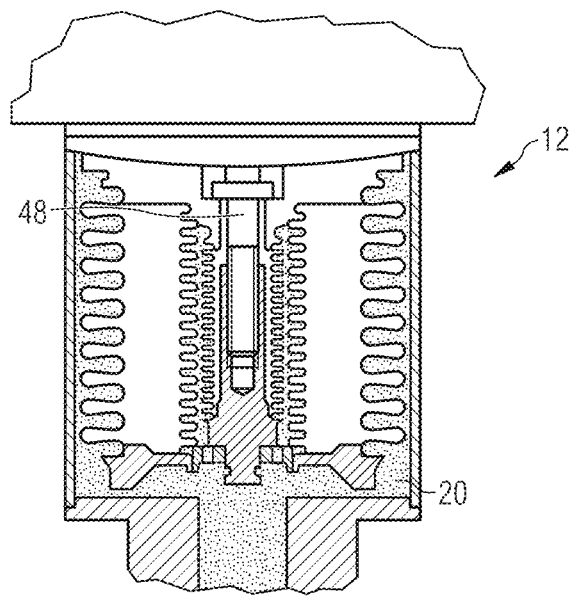
FIG. 3 is the measuring apparatus of FIG. 2 showing the space communicating with the gas chamber of a switchgear to be monitored.

Accordingly, the density monitor 10 is designed for monitoring a gas density in the gas chamber 20 (in fluid communication with the system 16) and comprises the first movable separating element 44 and the second movable separating element 35. The second movable separating element 35 separates a closed reference volume (see FIG. 4) to be filled with the reference gas 26 at a predetermined reference pressure from the gas chamber 20 highlighted in FIG. 3. The second movable separating element 35 separates the gas chamber 20 from a further space. The further space can be open to the environment and therefore is at ambient pressure.

The first separating element 44 can move relative to the second separating element 35 to a limited extent. This relative movement is limited by the at least one stop 52, 54. The drive element 48, which mechanically drives the indicator device 50, is coupled to one of the separating elements, in this case to the first separating element 44.

The operation of the density monitor 10 will be explained in more detail in the following.

Figure 2:
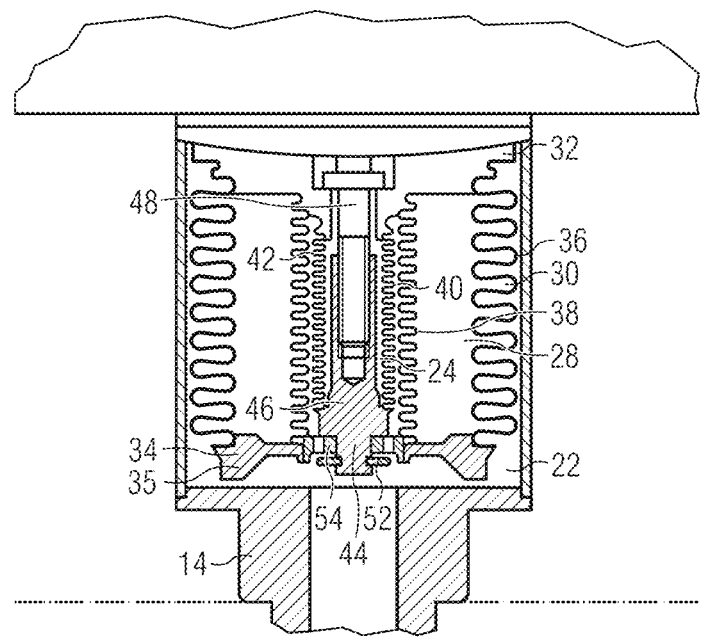
FIG. 2 is an enlarged detail of a measuring apparatus of the density monitor comprising a first measuring device and a second measuring device.

For a continuous presentation of the entire pressure range—first pressure range 62 and second pressure range 64—by means of the scale 60 and the pointer 58, two measuring devices 24, 28 are provided (see FIG. 2).

The two measuring devices 24, 28 are actuated one after the other. This ranges from the indication of a low pressure of the first pressure range 62 by actuation of the first measuring device 24 via an indication of the second pressure range 64 by means of the particularly high-resolution second measuring device 28, the measuring devices 24, 28 acting via the same switch rod on a measuring mechanism of the indicating device 50, which converts the stroke into a rotational movement of the pointer 58.

The high precision of the second measuring device 28 is compared to the density monitor known from the company brochure cited at the beginning.

As long as the reference gas filled in the reference chamber of the second measuring apparatus 28 has a higher pressure than the filling in system 16, the force flow via the second measuring apparatus 28 is initially interrupted.

The switch rod is only actuated via the first measuring device 24, which comprises the first measuring bellows 40, the driver 54 between the switch rod and the low pressure bottom 46, the low pressure bottom 46, and the upper stop 52 for the low pressure. Accordingly, the switch rod is pushed upwards by means of the first measuring device 24.

When the system gas 18 reaches the same pressure as or a higher pressure than the reference gas 26 in the reference chamber, the reference chamber is contracted and a force flow towards the switch rod is created via the driver 54. The first measuring device 24 is pulled along so that the switch rod continues to move upwards and reaches the zone of the second pressure range 64. Here the temperature-compensated switch point setting range is displayed.

A specific example of use will be described in the following.

The second measuring device 28 comprises the reference chamber lid 32, the outer bellows 36 of the reference chamber, the reference chamber bottom 34, the inner bellows 38 of the reference chamber, and the driver 54. The reference volume thus formed is filled e.g. at 600 kPa rel.

For example, if the system 16 is transported to a destination, the user of the density monitor 10 fills his system 16 with e.g. 200 kPa rel. The value, i.e. 200 kPa rel., is shown on the display area of the indicator device 50, in particular the scale 60 of the density monitor 10. Once the user has installed his system at the destination, he fills the system with the system gas pressure, e.g. 680 kPa. rel. During the filling process, the readable pressure on the display area 50 increases up to 600 kPa rel. via the first measuring device 24—up to this point, the reference gas 26 that has been filled with the same pressure counters to the pressure by means of the second measuring bellows 36. As soon as the pressure in the second gas chamber 20 is higher than the pressure in the reference chamber—reference gas 26—the reference chamber bottom 34 is pushed upwards with the driver 54, and by pulling the first measuring device 24 along, the switch rod will assume the stroke of the second measuring device 28 that can also be referred to as a high-resolution reference chamber measuring mechanism.

Figure 6:
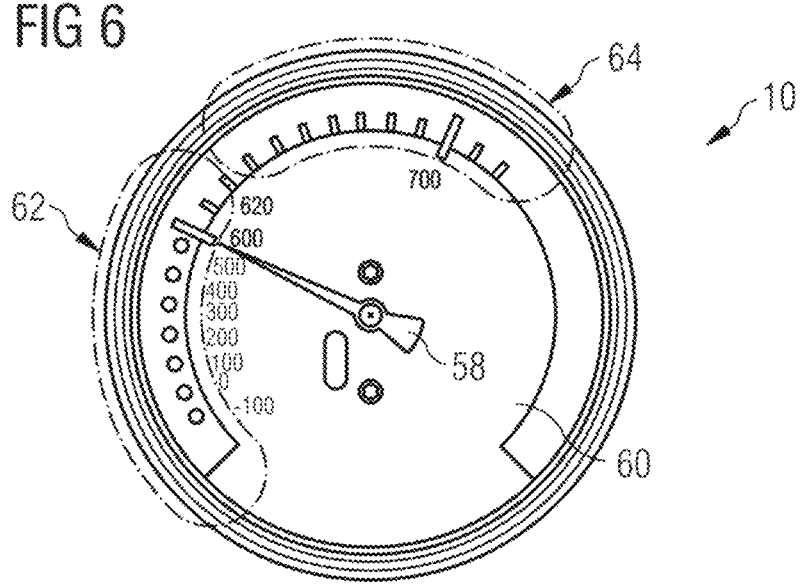
FIG. 6 is a schematic representation of a further preferred design of a density monitor.
Figure 6:
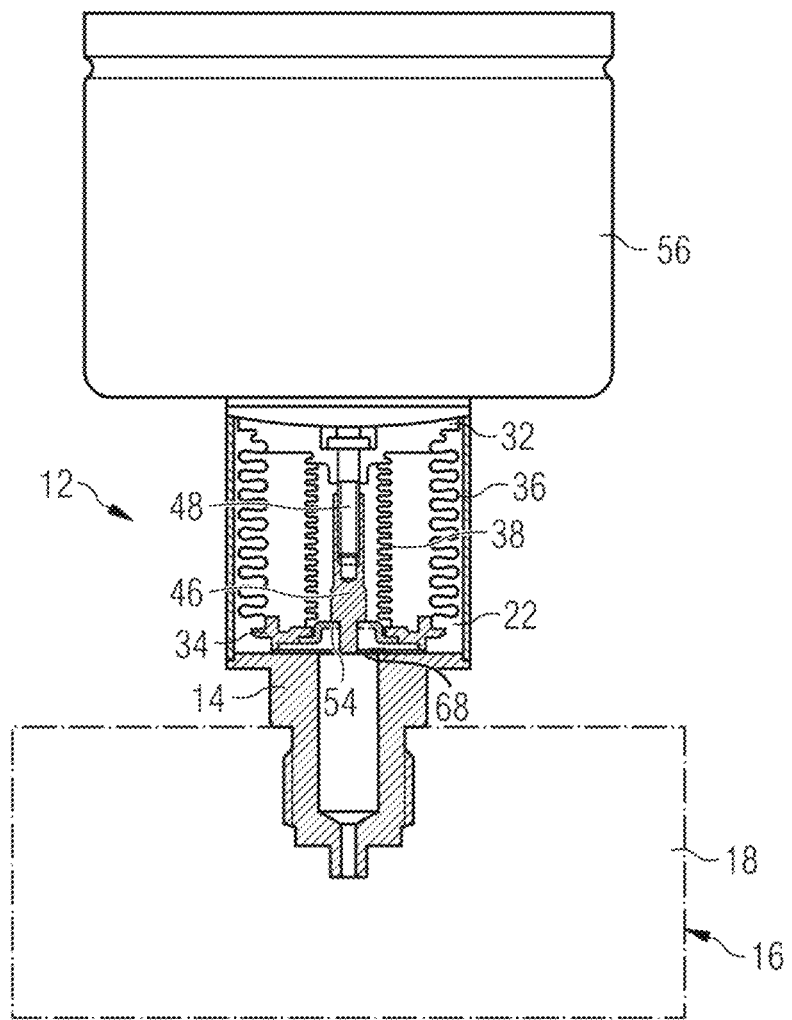

FIG. 6 shows another preferred design of a density monitor 10. The first measuring device 24 has a pressure membrane 68 instead of a first measuring bellows 40. Differently from the design variant shown in the FIGS. 1 to 5, a pressure membrane 68 is used in place of an integrated low pressure bellows, i.e. the first measuring bellows 40, which pressure membrane 68 also measures in relative terms with respect to the atmosphere. Instead of the stroke of the low pressure bellows, the stroke of the pressure membrane 68 is used for the presentation of the first pressure range 62 or low pressure range. The mechanical coupling and the operating principle are the same as in the design variant shown in the FIGS. 1 to 5.

Figure 7:
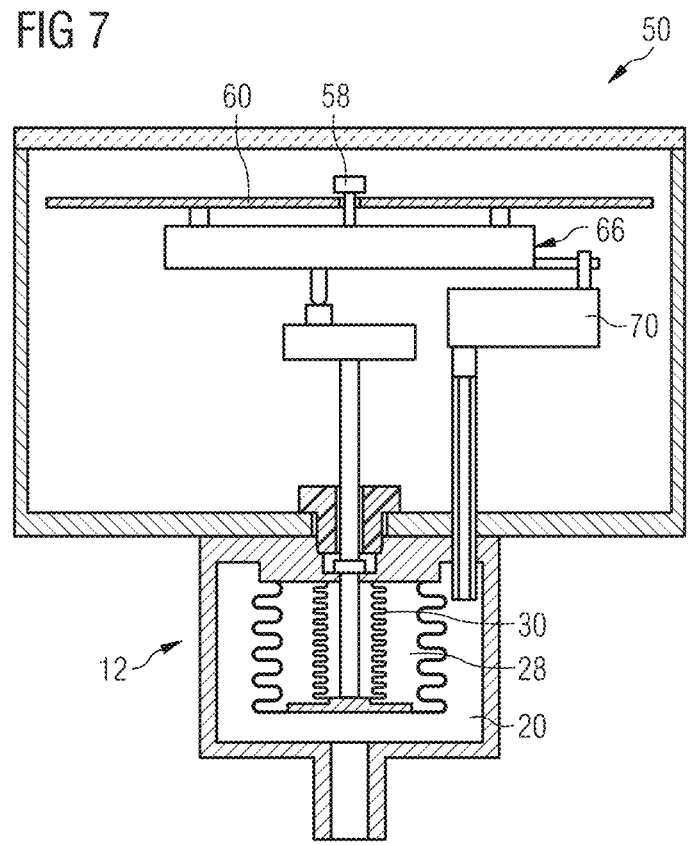
FIG. 7 is a schematic representation of a further preferred design of a density monitor.

FIG. 7 shows another preferred design of a density monitor 10. The measuring device 24 has a tubular spring 70 instead of a first measuring bellows 40. The two measuring devices, i.e. the first measuring device 24, which comprises the tubular spring 70 that measures in relative terms, and the second measuring device 28 are mechanically coupled via a measuring mechanism 66, in particular one comprising a driver segment.

As long as the reference gas filled in the second measuring device 28 has a higher pressure than the filling in the system 16, the force flow through the second measuring device 28 to the measuring mechanism 66 is initially interrupted. The measuring mechanism 66 is exclusively deflected by the tubular spring 70 via the system measuring in relative terms, i.e. the first measuring device 24, and the presentation on the scale 60 takes place via a radial driver segment of the measuring mechanism 66. As soon as the system gas reaches the same pressure as or a higher pressure than the reference chamber, the reference chamber is contracted and a stroke movement, in particular a translational stroke movement, is produced through the switch rod which acts upon an axial driver of the measuring mechanism 66. For this purpose, the drive element 48 formed as a switch rod can be coupled to the second separating element 35 of the second measuring device 28. The first measuring device 24 is overtaken due to the higher sensitivity of the second measuring device 28, and the force flow of the tubular spring 70 to the measuring mechanism 66 is interrupted. In other words, the low pressure measuring system is overtaken due to the higher sensitivity of the reference chamber measuring system and the force flow of the tubular spring 70 to the measuring mechanism 66 is interrupted. Accordingly, the second measuring device 28 only acts on the measuring mechanism 66 in the high-resolution zone of the main scale, i.e. in the temperature-compensated switch point setting range or second pressure range 64. In this case, the tubular spring 70 is coupled to the gas chamber 20, especially fluidically. In particular, the tubular spring 70 is partially arranged inside the gas chamber 20.

A specific exemplary embodiment will be described in more detail in the following.

The second measuring device 28, which is comprised of the reference chamber lid 32, the outer bellows 36 that can also be referred to as the outside reference chamber bellows, the reference chamber bottom 34, the inner bellows 38 that can also be referred to as the inside reference chamber bellows, and the driver 54 switch rod, is filled at 600 kPa abs. For transportation, the customer fills his system with 200 kPa rel. Due to the mechanical coupling with the measuring mechanism 66, the value, 200 kPa rel., is now shown on the scale 60 of the display area of the density monitor 10 via the first measuring device 24, which can also be referred to as a relative tubular spring measuring system. Once the customer has installed his system 16 at the destination, he fills the system with his system gas pressure of 680 kPa abs. During the filling process, the readable pressure on the indicator device 50 increases up to 600 kPa via the tubular spring measuring system. Up to this point, the reference chamber, which has been filled with the same pressure, counters to the pressure. As soon as the system pressure is higher than the pressure in the reference chamber, the compression of the second measuring device 28, which can also be referred to as a reference chamber measuring system, causes an upward excursion of the switch rod, and the measuring mechanism 66 is moved via the axial driver. At the same time, the force flow to the tubular spring driver is interrupted. Accordingly, in the operating condition of the system 16, the pressure is presented on the scale 60 in absolute terms and temperature-compensated by the reference chamber measuring system.

Figure 8:
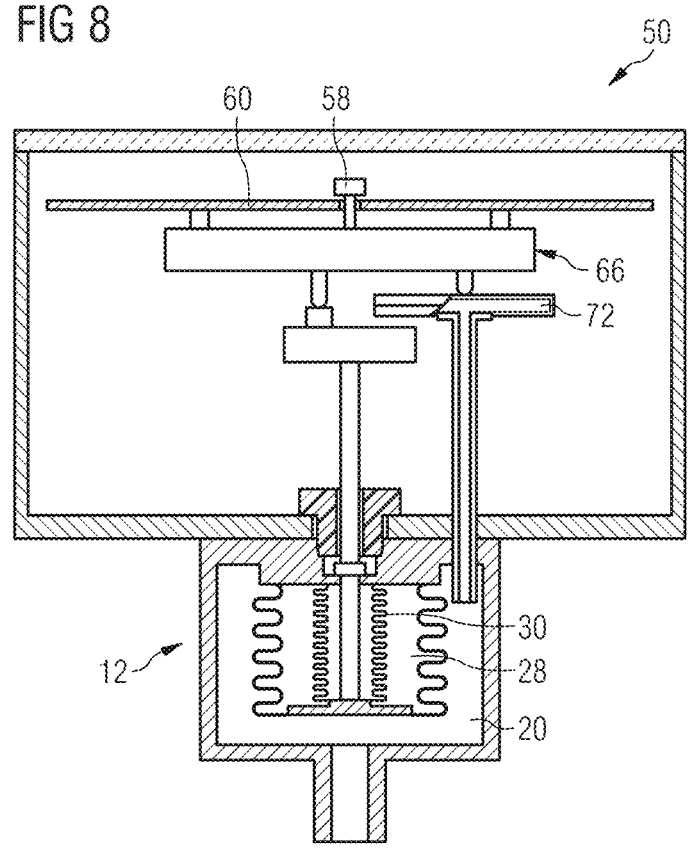
FIG. 8 is a schematic representation of a further preferred design of a density monitor.

FIG. 8 shows another preferred design of the density monitor 10. Instead of a first measuring bellows 40, the first measuring device 24 comprises a pressure cell 72. Differently from the embodiment shown in FIG. 7, the tubular spring 70 is replaced by the pressure cell 72 which also measures in relative terms with respect to an atmosphere. The mechanical coupling with the measuring mechanism 66 takes place axially via a transmission element. The transmission element can be a pin, for example. Preferably, the pressure cell 72 is coupled to the gas chamber 20, especially fluidically. In Particular, the pressure cell 72 is partially arranged inside the gas chamber 20. For this purpose, the drive element 48 designed as a switch rod can be coupled to the second separating element 35 of the second measuring device 28. The remaining functions are the same as the functions described in context with FIG. 7. As long as the reference gas filled into the second measuring device 28 has a higher pressure than the filling in the system 16, the force flow through the second measuring device 28 to the measuring mechanism 66 is initially interrupted. The measuring mechanism 66 is exclusively deflected by means of the pressure cell 72 via the system measuring in relative terms, hence the first measuring device 24, and is displayed on the scale 60. When the system gas reaches a pressure equal to or greater than that of the reference chamber, the reference chamber is contracted and a stroke movement, especially a translational stroke movement, which acts on an axial driver of the measuring mechanism 66, is produced via the switch rod. Due to the higher sensitivity of the second measuring device 28, the first measuring device 24 is overtaken, and the force flow of the pressure cell 72 to the measuring mechanism 66 is interrupted. Accordingly, the second measuring device 28 only acts on the measuring mechanism 66 in the high-resolution zone of the main scale, i.e. in the temperature-compensated switch point setting range or the second pressure range 64.

All in all, the invention discloses a combined gas density monitor for relative and absolute measurements including an indicator.

Two different measuring systems or measuring devices are required to ensure a continuous display of the entire pressure range with one scale and one pointer. For the first time, the two measuring systems are mechanically coupled in order to successively display the lower pressure in relative terms with respect to an atmosphere and then the operating pressure range of the system in absolute terms and temperature-compensated via the high-resolution reference chamber measuring system via a single measuring mechanism.

According to a preferred embodiment, the density monitor comprises a combined presentation of the entire pressure range by means of a scale using phosphorescent or fluorescent characters and display elements or an indicating element such as a pointer.

According to an advantageous design, the two measuring systems are actuated one after the other axially from the lower pressure via the high-resolution reference chamber measuring system vertically with a stroke via the same switch rod to a measuring mechanism, which converts the stroke into a rotation of the pointer. The high precision of the reference chamber measuring system is maintained.

As long as the reference gas filled into the reference chamber measuring system has a higher pressure than the filling of the system, the force flow through the reference chamber measuring system is initially interrupted. The switch rod is pushed upwards only via the low pressure measuring system that consists of the low pressure bellows, the driver shift rod/low pressure and upper stop low pressure. When the system gas reaches a pressure equal to or greater than that of the reference chamber, the reference chamber is contracted and a force flow to the switch rod is produced via the driver shift rod/low pressure. The low pressure measuring system is pulled along so that the switch rod moves further upwards and reaches the zone of the high-resolution main scale, i.e. the temperature-compensated switch point setting range.

Differently from this design variant, in a further alternative embodiment, a pressure membrane can be used instead of an integrated low pressure bellows which also measures in relative terms with respect to an atmosphere. Instead of the stroke of the low pressure bellows, the stroke of the pressure diaphragm is used to display the low pressure range. The mechanical coupling and the operating principle remain unchanged.

In a further alternative embodiment, a tubular spring is used for the deep or lower pressure range. The two measuring systems, i.e. a tubular spring for a relative measurement and the reference chamber measuring system, are mechanically coupled together via a specific measuring mechanism including a radial driver segment. As long as the reference gas filled into the reference chamber measuring system has a higher pressure than the filling in the system, the force flow through the reference chamber measuring system to the measuring mechanism is initially interrupted. The measuring mechanism is exclusively deflected by a tubular spring via the system measuring in relative terms and is displayed on the scale via a radial driver segment of the measuring mechanism. When the system gas reaches a pressure equal to or greater than that of the reference chamber, the reference chamber is contracted and a translational stroke movement which acts on an axial driver of the measuring mechanism is produced via the switch rod. Due to the higher sensitivity of the reference chamber measuring system, the low pressure measuring system is overtaken and the force flow of the tubular spring to the measuring mechanism is interrupted. Accordingly, the reference chamber measuring system only acts on the measuring mechanism in the high-resolution zone of the main scale, i.e. in the temperature-compensated switch point setting range.

The reference chamber measuring system consisting of reference chamber lid, reference chamber bellows outside, reference chamber bottom, reference chamber bellows inside and driver switch rod is filled at 600 kPa abs. For transportation, the customer fills his system with 200 kPa rel. The indicator of the density monitor now shows the value on the scale, 200 kPa rel., via the relative tubular spring measuring system due to the mechanical coupling with the measuring mechanism. Once the customer has installed his system at the destination, he fills it with his system gas pressure of 680 kPa abs. During filling, the pressure readable on the display 15 rises up to 600 kPa abs. via the tubular spring measuring system. Up to this point, the reference chamber, which is filled with the same pressure, counters to the pressure. As soon as the system pressure is higher than in the reference chamber, the compression of the reference chamber measuring system causes the excursion of the switch rod upwards, and the measuring mechanism is moved via the axial driver, while at the same time the force flow to the tubular spring driver is interrupted. Thus, in the operating state of the system, the pressure is shown on the in absolute terms and temperature-compensated by the reference chamber measuring system.

The two measuring systems, a tubular spring measuring in relative terms, and the reference chamber measuring system are mechanically together via a measuring mechanism, which especially includes a radial driver segment. As long as the reference gas filled into the reference chamber measuring system has a higher pressure than the filling in the system, the force flow through the reference chamber measuring system to measuring mechanism is interrupted. The measuring mechanism is deflected exclusively by a tubular spring via the system measuring in relative terms and is displayed on the scale via a radial driver element of the measuring mechanism. When the system gas reaches a pressure equal to or greater than that of the reference chamber, the reference chamber is contracted and a translational stroke movement is produced via the switch rod which acts on the axial driver of the measuring mechanism. Due to the higher sensitivity of the reference chamber measuring system, the low pressure measuring system is overtaken and the force flow of the tubular spring to the measuring mechanism is interrupted. Accordingly, the reference chamber measuring system only acts on the measuring mechanism in the high-resolution zone of the main scale, i.e. in the temperature-compensated switch point setting range.

In a further alternative embodiment, a separate pressure membrane or pressure cell are used for the low pressure range. Differently from the design variant including a tubular spring, a pressure cell is used instead of the tubular spring which also measures in relative terms with respect to an atmosphere. The mechanical coupling with the measuring mechanism takes place axially via a second driver, e.g. a pin. All the other functions remain unchanged.

LIST OF REFERENCE SIGNS 10 density monitor
12 measuring apparatus
14 pressure connection
16 system
18 system gas
20 gas chamber
22 sensor housing
24 first measuring device
26 reference gas
28 second measuring device
30 second measuring bellows
32 reference chamber lid
34 reference chamber bottom
35 second separating element
36 outer bellows
38 inner bellows
40 first measuring bellows
42 low pressure bellows
44 first separating element
46 low pressure bottom
48 drive element
50 indicator device
52 stop
54 driver
56 density monitor housing
58 pointer
60 scale
62 first pressure range
64 second pressure range
66 measuring mechanism
68 pressure membrane
70 tubular spring
72 pressure cell

The invention claimed is:

1. A density monitor for monitoring a gas density in a gas chamber, comprising:
a measuring apparatus having a first measuring device and a second measuring device, the first measuring device and the second measuring device being coupled together,
wherein the first measuring device is configured to measure a first pressure range in relative terms with respect to an atmosphere, and
wherein the second measuring device is configured to measure a second pressure range, which is higher than the first pressure range, in absolute terms;
an indicator device configured to display the first pressure range and the second pressure range; and
a movable drive element configured to drive the indicator device, wherein at least one of the two measuring devices is configured to move the drive element in order to drive the indicator device,
wherein the indicator device comprises an indicator element, and
wherein the indicator element is configured to indicate the first pressure range and the second pressure range.

2. The density monitor according to claim 1, wherein the second measuring device is further designed configured to measure the second pressure range in temperature-compensated form.

3. The density monitor according to claim 1, wherein the first measuring device comprises a first movable separating element, which is configured to separate the gas chamber from a further space, wherein the first movable separating element is arranged on a first measuring bellows that separates the gas chamber from the further space.

4. The density monitor according to claim 3, wherein the second measuring device comprises a second movable separating element, which is configured to separate a closed reference volume to be filled with a reference pressure from the gas chamber, the second separating element being arranged on a second measuring bellows that separates the reference volume from the gas chamber, and
wherein the first separating element and the second separating element are movable relative to each other in a manner limited by a stop so that the first separating element and the second separating element are movable relative to each other to an extent limited by the stop.

5. The density monitor according to claim 1, wherein the first measuring device comprises a pressure membrane for measuring the first pressure range.

6. The density monitor according to claim 5, wherein the pressure membrane is configured to drive the display device via a stroke of the pressure membrane.

7. The density monitor according to claim 1, wherein the first measuring device comprises a tubular spring for measuring the first pressure range.

8. The density monitor according to claim 7, wherein a pinion of the indicator device is coupled to the tubular spring in such a way that when measuring the first pressure range, a radial movement is transmitted to the indicator device, the radial movement being converted into a rotational movement of the indicator element in order to indicate the first pressure range.

9. The density monitor according to claim 1, wherein the first measuring device comprises a pressure cell for measuring the first pressure range.

10. The density monitor according to claim 9, wherein the display device comprises a transmission element, which is designed to receive a vertical movement of the pressure cell and to convert it into a rotational movement of the indicator element in order to indicate the first pressure range.

11. The density monitor according to claim 1, wherein the indicator device further comprises a display area with characters and/or scale, wherein the indicator element and/or scale and/or characters comprises a phosphorescent or fluorescent material.

\* \* \* \* \*